Oct. 21, 1930.   G. C. SWANSON   1,778,920
QUACK GRASS ERADICATOR
Filed Aug. 22, 1927

Inventor
Godfrey C. Swanson
By Bradbury + Caswell
Attorneys

Patented Oct. 21, 1930

1,778,920

UNITED STATES PATENT OFFICE

GODFREY C. SWANSON, OF RED WING, MINNESOTA

QUACK-GRASS ERADICATOR

Application filed August 22, 1927. Serial No. 214,608.

My invention relates to quack grass eradicators and has for an object to provide a machine whereby the quack grass roots are effectively withdrawn from the earth, the earth shaken out of the same and the bare roots deposited upon the ground where they may be readily gathered by a rake or left to the withering action of the sun's rays.

An object of the invention resides in providing a wheel supported draught frame carrying a revoluble cylinder arranged with tines adapted to loosen the earth as the frame is drawn along the ground and to further provide in conjunction with said cylinder a revoluble roll having tines adapted to intermesh with the tines of said cylinder and at the tips thereof to dig into the surface of the soil loosened by said tines on said cylinder.

A still further object of the invention resides in driving said roll from said cylinder at a relatively high rate of speed so that mixed grass and soil engaged by the roll tines at the ground surface and on the cylinder between the cylinder tines may be thrown sufficiently high to permit the settling of the soil beneath the grass and roots thereof.

With the foregoing and other objects in view, which will appear in the following description, the invention resides in the novel combination and arrangement of parts and in the details of construction hereinafter described and claimed.

Figure 1:
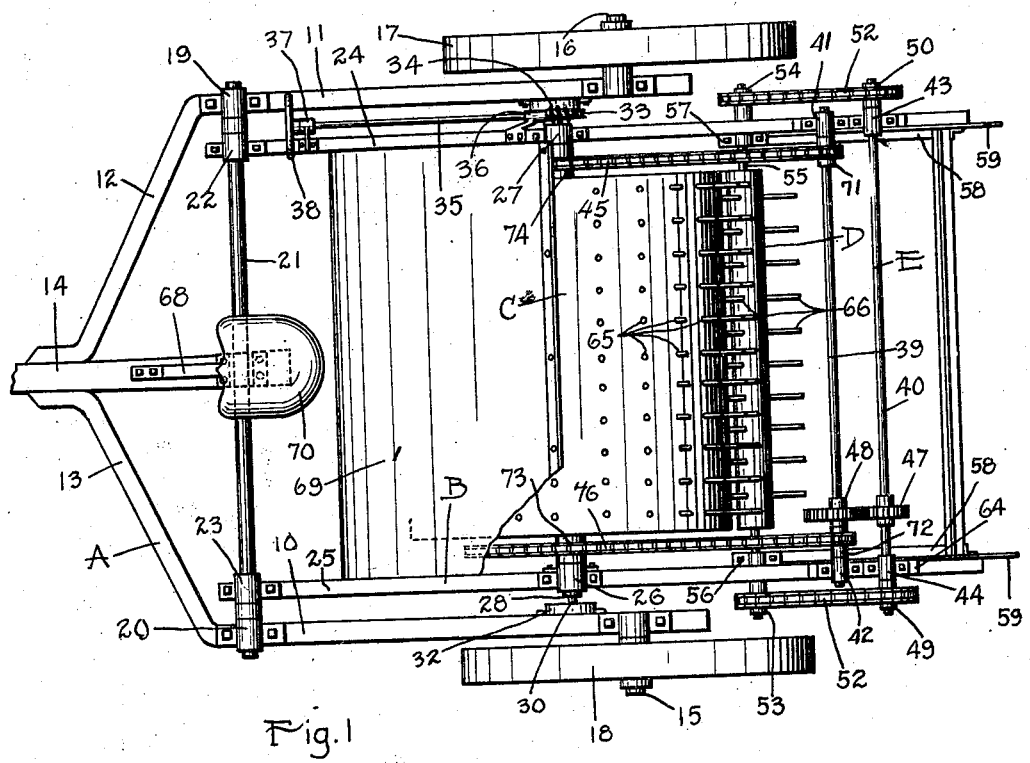
Fig. 1 is a plan view of a quack grass eradicator illustrating an embodiment of my invention.

The invention consists of a wheel supported frame A carrying a pivotally attached auxiliary frame B which has rotatably mounted thereon a cylinder C and a roll D. The cylinder C is operated through engagement with the ground and drives the roll D through a transmission device E so as to effectively remove the quack grass roots from the earth over which the machine travels.

The frame A consists of two spaced longitudinal frame members 10 and 11 which are brought together at their forward ends 12 and 13. These frame members are attached to a tongue 14 or any other suitable hitching device by means of which the machine may be drawn over the ground. The frame members 10 and 11 are spaced throughout their length and have attached to them at their rearward ends two trunnions 15 and 16 on which are rotatably mounted two wheels 17 and 18. These wheels serve to carry the structure in traveling over ground where it is not desired that the cylinder C and roll D be operated.

At the forward end of the frame structure A are disposed two bearings 19 and 20 which are attached to the longitudinal frame members 10 and 11. In these bearings is journaled a shaft 21 which has rigidly secured to it by means of clamps 22 and 23 two longitudinal frame members 24 and 25, which constitute the auxiliary frame structure B. These two members are adapted to swing with the shaft 21 in the bearings 19 and 20 so as to permit of raising and lowering the free ends thereof relative to the frame A. Near the center of the frame members 24 and 25 are disposed two bearings 26 and 27 in which is journaled a tubular shaft 28 having rigidly secured thereto the cylinder C previously referred to. This cylinder is of fairly large dimensions and is of a diameter comparable with that of the supporting wheels 17 and 18.

The frames A and B are held in adjusted position relative to one another by means of the following construction: Through the tubular shaft 28, supporting the cylinder C, is disposed a shaft 30 which protrudes beyond the ends of said tubular shaft and has rigidly secured to the ends thereof two spur pinions 31. These pinions are adapted to mesh with two gear segments 32 best seen in Fig. 2, which are directly bolted to the longitudinal frame members 10 and 11 of the frame structure A. Upon the outermost end of the shaft 30 is attached a worm wheel 33 which is adapted to mesh with a worm 34 mounted on a longitudinal shaft 35. Shaft 35 is journaled in two bearings 36 and 37 attached to the frame member 24 of the frame structure B and has mounted upon its forward end a hand wheel 38 by means of which the same may be rotated. The worm 34 and the worm wheel 33 serve as a lock for holding the shaft 30 in fixed position. By turning the wheel 38 the pinions 31 are caused to rotate and move along the gear segments 32, thus shifting the two frames vertically relative to one another and throwing the weight of the machine on the cylinder C or on the supporting wheels 17 and 18, as may be desired.

The roll D is mounted upon a shaft 55 which is journaled in bearings 56 and 57. These bearings are attached to the ends of two pairs of depending arms 58 and 59 adjustably secured to the frame members 24 and 25 through bolts 60 and 61. These bolts are adapted to pass through any of a series of holes 62 and 63 in said arms so that the position of the roll relative to the cylinder may be adjusted both as to height and degree of separation.

The roll D is driven from the cylinder C by means of the transmission device E previously referred to. This device includes a jack shaft 39 and a counter shaft 40 disposed rearwardly of the machine and journaled in bearings 41, 42, 43 and 44 secured to standards 64 mounted on the two frame members 24 and 25 of the frame structure B. The jack shaft 39 has attached to it two sprocket pinions 71 and 72 which are driven through two sprocket chains 45 and 46 from two sprocket wheels 73 and 74 fast on the tubular shaft 28. It will be noted that the sprocket wheels 73 and 74 are of relatively large diameter and the sprocket pinions 71 and 72 are of relatively small diameter so that the shaft 39 rotates at a higher rate of speed than the tubular shaft 28. The counter shaft 40 is driven from the jack shaft 39 by means of two spur gears 47 and 48 which are respectively keyed upon said shafts and mesh with one another. The shaft 40 extends outwardly beyond the frame members 24 and 25 and has attached to its outer ends two sprocket pinions 49 and 50. These sprocket pinions drive the roll D through two chains 51 and 52 which pass over the said sprocket pinions and over two similar sprocket pinions 53 and 54 secured to the end of the roll shaft 55. In this manner the roll D is caused to rotate reversely and at a higher rate of speed than the cylinder C, so as to function in the desired manner.

Figure 2:
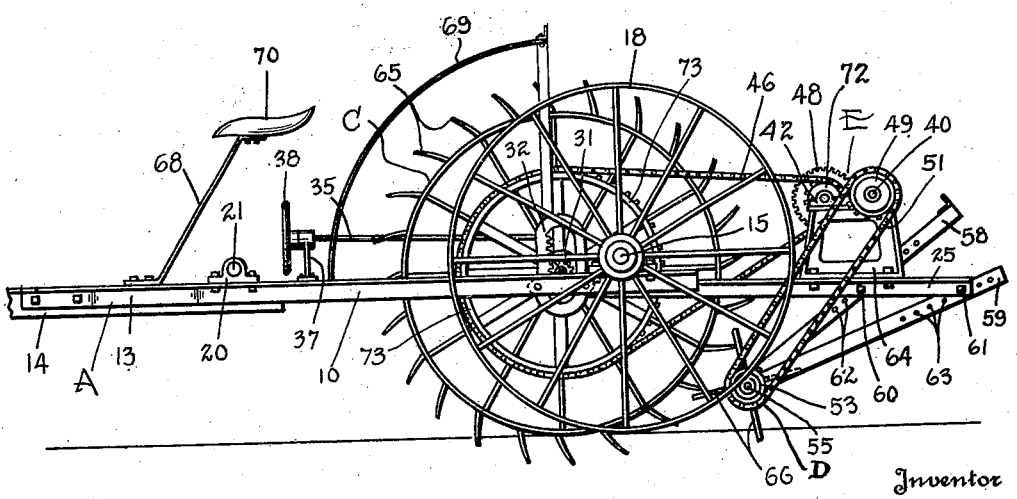
Fig. 2 is a side elevational view of the structure shown in Fig. 1.

The cylinder C is fitted with a plurality of tines 65 extending from the surface thereof, which tines are slightly curved as indicated in Fig. 2. When the weight of the machine is imposed upon these tines, the same are forced into the ground. A certain amount of movement of said tines through the ground occurs due to the difference between the speed of the periphery of the cylinder and the ends of the tines. This movement produces a ground breaking action in the tines while they are below the surface of the ground, thus causing the tines to gather to themselves any grass or roots encountered in the soil. The roll D is fitted with tines 66 slightly longer than tines 65, said roll being set with respect to the cylinder C so that said tines of the two sets will intermesh and so that the tips of tines 66 will dig into the surface of the broken ground back of cylinder C yet slightly clear said cylinder.

If desired, a driver's seat 70 may be employed mounted on a spring 68 attached to the tongue 14, whereby the machine may be controlled as it is drawn along the ground. In addition, a guard 69 may be employed to cover the forward end of the cylinder C. Such other accessories may also be employed with the device as are now in common use in conjunction with farm machinery, which being well known, have not been shown in detail in this application.

In the operation of the device, the roll D is set so that the tines 66 thereof just clear the surface of the cylinder C and so that the same penetrate the ground a short distance. When the weight of the machine has been shifted to the cylinder C and the machine is drawn over the ground, cylinder C rotates and has the effect of successively forcing the tines 65 into the ground. This loosens up the earth as the device moves along and lifts it as in a wave rearwardly toward the roll D. The tines 66 of roll D, also entering the ground, catch the loosened soil immediately back of the cylinder C and throw the same upwardly. With the roll D turning from the bottom toward the cylinder C and at a relatively higher speed than said cylinder, the tines 66 set up a beating action of the soil against the cylinder and, further, effectively strip all earth, roots and grass from said cylinder and the tines 65 thereon. As the soil, grass and roots fall to the ground, the grass and roots being lighter than the earth are slower in their descent by gravity than the soil, the result being that the liberated roots and grass are caused to be deposited upon the ground surface fully exposed to the withering action of the sun which kills the roots.

The invention is advantageous in that the same most effectively removes the quack grass roots from the earth and deposits them upon the fallen earth so as to be exposed to the rays of the sun. The roll is driven solely through the cylinder of the machine so that auxiliary power is not necessary to operate the device. The relative positions of the roll and cylinder may be readily adjusted to suit varying conditions and the entire cylinder and roll structure may be raised above the ground to permit of transporting the device upon the supporting wheels thereof whenever it is desirable to move the eradicator from one locality to another.

Changes in the specific form of my invention, as herein disclosed, may be made within the scope of what is claimed without departing from the spirit of my invention.

Having described my invention, what I claim as new and desire to protect by Letters Patent is:

1. A quack grass eradicator comprising a wheel supported frame, a shaft extending transversely of said frame at the forward end thereof, a pair of auxiliary frame members journaled on said shaft and extending rearwardly thereof, a cylinder rotatably mounted upon said auxiliary frame member, said frame members extending rearwardly of said cylinder, a pair of depending arms adjustably secured to each of said auxiliary frame members, a roll rotatably mounted in the ends of said arms, a jack shaft positioned across said auxiliary frame members rearwardly of said cylinder, means for driving said jack shaft from said cylinder, a counter shaft arranged parallel with said jack shaft, means for driving said counter shaft from said jack shaft in the opposite direction, and means for driving said roll from said counter shaft, said roll and cylinder being provided with intermeshing tines adapted simultaneously to engage the earth for the removal of quack grass therefrom.

2. A quack grass eradicator comprising a wheel supported frame, a subframe connected to said wheel supported frame, a cylinder rotatably mounted on said subframe, means for adjusting said subframe relative to said main frame to raise and lower said cylinder relative to the earth, a second cylinder mounted on said subframe and adapted to rotate in proximity to said first cylinder, tines formed on said cylinders, and means for adjustably supporting said second cylinder for independent movement relative to the earth.

3. A quack grass eradicator comprising a wheel supported frame, a subframe connected to said wheel supported frame, a cylinder rotatably mounted on said subframe, means for adjusting said subframe relative to said main frame to raise and lower said cylinder relative to the earth, a second cylinder mounted on said subframe and adapted to rotate in proximity to said first cylinder, tines formed on said cylinders, and means for adjustably supporting said second cylinder for movement toward or from said first cylinder and toward or from the earth.

4. A quack grass eradicator comprising a frame, a cylinder rotatably mounted on said frame, a second cylinder disposed to the rear of said first cylinder and near the lowermost portion thereof, an adjustable mounting on said frame for said second cylinder, a shaft extending across said frame rearwardly of both of said cylinders, means for driving said shaft from said first cylinder and a chain for driving said second cylinder from said shaft, said chain permitting of adjustment of said second cylinder toward or from said first named cylinder, and means for holding said second cylinder in adjusted position.

5. An eradicator of the character described comprising a frame, a rotatable earth engaging member mounted on said frame and having tines adapted to penetrate the earth and withdraw vegetation therefrom, means for regulating the depth of penetration of said tines into the earth, a second rotatable member having tines and disposed at the rear of said first member, means for adjustably mounting said second member on said frame for movement toward and from said first member to cause the tines of said members to intermesh to a greater or lesser extent at any of the various depths of penetration of the tines of said first member.

6. An eradicator of the character described comprising a frame, a rotatable earth engaging member mounted on said frame and having tines adapted to penetrate the earth and withdraw vegetation therefrom, a second rotatable member having tines and disposed at the rear of said first member, means for adjustably supporting said second member on said frame for movement toward and from said first rotatable member at a given elevation to cause the tines of said members to intermesh to a greater or lesser extent, and means for rotating said second member.

7. A quack grass eradicator comprising a wheel supported frame, a second frame pivoted to said first frame and extending rearwardly thereof, a cylinder rotatably mounted upon said second frame, a roll rotatably mounted rearwardly of said cylinder, means for supporting said roll for rotation from said second frame, a counter-shaft extending across said second frame at the rearward end thereof, means for driving said counter-shaft from said cylinder in a direction opposite to the direction of rotation of said cylinder, means for driving said roll from said counter-shaft in the same direction of rotation as said counter-shaft, said roll and cylinder being provided with intermeshing tines adapted simultaneously to engage the earth for the removal of quack grass therefrom.

8. In a machine of the character described, a frame, a cylinder revolubly mounted on the frame and adapted to roll along the ground, said cylinder having hooked tines issuing therefrom for loosening and lifting the root infested soil along the ground at the rear of the cylinder, a roll carried by said frame and disposed rearwardly of the cylinder and driven to rotate in a direction counter to the direction of rotation of said cylinder and at a relatively high rate of speed, tines, embodied in the roll, intermeshing with the tines on the cylinder and serving to beat and throw upwardly the soil and roots lifted by said tines on said cylinder, said roll being adjustable to vary the intermeshing relation of the tines thereof with the tines of said cylinder and being further adjustable independently of and without disturbing the existing intermeshing relation between the tines of the roll and cylinder to vary the elevational relation of the roll with respect to said cylinder.

9. An eradicator of the character described comprising a frame, a rotatable earth engaging member mounted on said frame and having tines adapted to penetrate the earth and withdraw vegetation therefrom, a second rotatable member fitted with tines and disposed at the rear of said first member, means for mounting said second member on said frame, said means providing for the adjustment of the second member toward and from and up and down with respect to said first member, to vary the intermeshing of the tines of said members in various elevational relations between said members.

In testimony whereof I have affixed my signature to this specification.

GODFREY C. SWANSON.